(12) United States Patent
Kishikawa et al.

(10) Patent No.: US 9,741,164 B2
(45) Date of Patent: Aug. 22, 2017

(54) 3D MAP DISPLAY SYSTEM

(71) Applicant: GEO TECHNICAL LABORATORY CO., LTD., Fukuoka-shi, Fukuoka (JP)

(72) Inventors: Kiyonari Kishikawa, Fukuoka (JP); Eiji Teshima, Fukuoka (JP); Masatoshi Aramaki, Fukuoka (JP); Masashi Uchinoumi, Fukuoka (JP); Masaru Nakagami, Fukuoka (JP); Tatsuya Azakami, Fukuoka (JP); Tatsurou Yonekura, Fukuoka (JP)

(73) Assignee: Geo Technical Laboratory Co., Ltd., Fukuoka-shi (JP)

( * ) Notice: Subject to any disclaimer, the term of this patent is extended or adjusted under 35 U.S.C. 154(b) by 0 days.

(21) Appl. No.: 15/008,291

(22) Filed: Jan. 27, 2016

(65) Prior Publication Data
US 2016/0140756 A1 May 19, 2016

Related U.S. Application Data

(63) Continuation of application No. PCT/JP2014/068658, filed on Jul. 14, 2014.

(30) Foreign Application Priority Data

Aug. 12, 2013 (JP) .................................. 2013-167235

(51) Int. Cl.
*G06T 17/05* (2011.01)
*G06T 3/40* (2006.01)
*G06T 11/20* (2006.01)
*G06T 15/40* (2011.01)

(52) U.S. Cl.
CPC .............. *G06T 17/05* (2013.01); *G06T 3/40* (2013.01); *G06T 11/203* (2013.01); *G06T 15/405* (2013.01); *G06T 2200/04* (2013.01)

(58) Field of Classification Search
CPC ......... G06F 17/30241; G06F 17/30873; G06F 17/30061; G09G 5/377; G01C 21/367;
(Continued)

(56) References Cited

U.S. PATENT DOCUMENTS

2001/0005810 A1* 6/2001 Senda ................ G01C 21/3635
715/848
2007/0172147 A1 7/2007 Fujiwara et al.
(Continued)

FOREIGN PATENT DOCUMENTS

JP 9-138136 5/1997
JP 2003-166836 6/2003
(Continued)

OTHER PUBLICATIONS

Search Report dated Sep. 30, 2014 from International Application No. PCT/JP2014/068658.
(Continued)

*Primary Examiner* — Haixia Du
(74) *Attorney, Agent, or Firm* — Beyer Law Group LLP

(57) ABSTRACT

A three-dimensional (3D) map display system displays a 3D map on which a ground surface and a feature are represented three-dimensionally. The 3D map display system includes (a) a map database for storing map data representing a 3D shape of the ground surface and the feature, (b) a first drawing unit for drawing the ground surface and the feature by executing depth determination by referring to the map database, and (c) a second drawing unit for drawing a target feature, which is a feature in which at least a part thereof is hidden by a ground surface or other features in the drawing by the first drawing unit, by overwriting the target feature on a drawing result by the first drawing unit by using the map data without executing depth determination with respect to the drawing result by the first drawing unit.

15 Claims, 14 Drawing Sheets

(58) Field of Classification Search
CPC ........................ G01C 21/3638; G01C 21/3635; G01C 21/32; G01C 21/3682; G06T 17/05; G06T 19/006; G06T 2207/10032; G09B 29/00; G09B 25/04; G09B 29/008; G08G 5/0013; G08G 1/0969; G01S 17/89
See application file for complete search history.

(56) References Cited

U.S. PATENT DOCUMENTS

| | | | | |
|---|---|---|---|---|
| 2011/0109618 A1* | 5/2011 | Nowak | ............. | G01C 21/3647 345/419 |
| 2011/0225546 A1* | 9/2011 | Ramos | .................... | G06F 3/048 715/823 |
| 2013/0084838 A1* | 4/2013 | Smith | ............... | G06F 17/30241 455/414.2 |

FOREIGN PATENT DOCUMENTS

| | | |
|---|---|---|
| JP | 2004-333155 | 11/2004 |
| JP | 2005-195475 | 7/2005 |
| JP | 2005-345299 | 12/2005 |
| JP | 2007-026201 | 2/2007 |
| JP | 2008-128928 | 6/2008 |

OTHER PUBLICATIONS

Chinese Office Action dated Apr. 18, 2017 from Chinese Patent Application No. 201480043937.5.

* cited by examiner

3D MAP DISPLAY SYSTEM

CLAIM OF PRIORITY

This application is a Continuation of International Patent Application No. PCT/JP2014/068658, filed on Jul. 14, 2014, which claims priority to Japanese Patent Application No. 2013-167235, filed on Aug. 12, 2013, each of which is hereby incorporated by reference.

BACKGROUND OF THE INVENTION

1. Field of the Invention

The present invention relates to a technology for displaying a 3D map on which ground surfaces and features are represented three-dimensionally.

2. Description of the Related Art

Conventionally, a three-dimensional (3D) map on which features are represented three-dimensionally have been popular. Since the 3D map is easy to grasp a three-dimensional shape of a feature, it is highly convenient. This 3D map is drawn by projecting a 3D model of a feature from a view point set within a 3D space. In general, when a feature is to be drawn in a 3D map, in order to realistically display a depth feeling of the feature, depth determination (depth test) and hidden-surface processing are executed. Thus, a building that is hidden by other buildings and cannot be seen from the view point is not drawn. Moreover, an underground structure such as a tunnel is also hidden by a ground surface and is not drawn. As a result, in the 3D map, such obstructions can occur that a positional relation between the buildings cannot be understood easily or since the tunnel is not drawn, connection between roads cannot be understood easily or the like.

On the other hand, in a two-dimensional (2D) map, the building is not hidden by other buildings and as disclosed in Japanese Patent Laid-Open No. 9-138136, the tunnel is represented by a broken line or the like so that connection between the roads can be understood easily. That is, in the 3D map, by realizing realistic representation, to the contrary, convenience as a map is lost in a sense.

By considering these points, Japanese Patent Laid-Open No. 2004-333155 discloses a technology which makes it possible to visually recognize a point of interest by using transparent display of a building in front of the point of interest in the 3D map. Moreover, Japanese Patent Laid-Open Nos. 2008-128928 and 2003-166836 disclose a technology indicating a position of the underground structure on the map by drawing a planar shape of the underground structure on the ground surface.

However, when a map is drawn, the ground surface cannot be made transparent, and the technology in Japanese Patent Laid-Open No. 2004-333155 cannot be applied to representation of an underground structure. Applicable ranges of the technologies in Japanese Patent Laid-Open Nos. 2008-128928 and 2003-166836 are limited such that, if the ground surface has a 3D shape including irregularity, the technologies cannot be applied, and moreover, there remains a problem that they can only represent the position and the shape of the underground structure in a planar manner.

BRIEF DESCRIPTION OF THE INVENTION

The present invention was made in order to solve the aforementioned problems and has an object to alleviate the obstructions in drawing a 3D map caused by depth determination.

In order to solve at least a part of the aforementioned problems, the present invention employed the following constitution.

An apparatus in accordance with one embodiment of the present invention is a 3D map display system for displaying a 3D map on which a ground surface and a feature are represented three-dimensionally. The apparatus includes (a) a map database for storing map data representing a 3D shape of the ground surface and the feature, (b) a first drawing unit for drawing the ground surface and the feature by executing depth determination by referring to the map database, and (c) a second drawing unit for drawing a target feature, which is a feature in which at least a part thereof is hidden by a ground surface or other features in the drawing by the first drawing unit, by overwriting the target feature on a drawing result by the first drawing unit by using the map data without executing depth determination with respect to the drawing result by the first drawing unit.

The target feature in the present invention does not necessarily have to be set exclusively with respect to the feature drawn by the first drawing unit. For example, if a tunnel is assumed to be a target feature, this tunnel may be included in a feature drawn by the first drawing unit.

The phrase "the target feature is drawn without executing depth determination with respect to the drawing result by the first drawing unit" means that the target feature is drawn regardless of a depth relation between the ground surface and the feature drawn by the first drawing unit, and the second drawing unit may execute depth determination between the target features. Moreover, the second drawing unit may draw by directly overwriting the target feature on the drawing result by the first drawing unit or generate a layer drawing the target feature separately from the drawing result by the first drawing unit and superpose this on the drawing result by the first drawing unit.

By configuring as above, the target feature is displayed on a front of the drawing result by the first drawing unit. For example, by setting the underground structure such as a tunnel of a road to the target feature, after the ground surface is drawn, the target feature can be drawn on it. Moreover, in the 3D map display system of the present invention, by setting a building or a road hidden by a building on the front side closer to the view point position to a target feature, it can be brought to the front as compared with the other buildings and the like and can be drawn. That is, according to the 3D map display system of the present invention, the obstructions in drawing a 3D map caused by the depth determination that the feature is not drawn or hidden by other features can be alleviated.

The present invention is characterized by that a target feature is drawn on the basis of the 3D map data. By configuring as above, the target feature can be drawn in a state in which a 3D shape is reflected, and the target feature can be displayed on a 3D map without giving a serious sense of discomfort. Moreover, since the 3D map is drawn at various view-point positions and direction of the line of sights, if the target feature is to be drawn by a 2D image, various types of image data according to these view-point positions and direction of the line of sights need to be prepared, but if they are drawn on the basis of the 3D map data, it has a merit that a drawing according to the view-point position and the direction of the line of sights can be realized without preparing such data.

In the 3D map display system of one embodiment of the present invention, the target feature drawn by the second drawing unit can be specified by various modes.

For example, in the 3D map display system of the present invention, the map data includes data representing an underground portion, and the second drawing unit may identify the target feature on the basis of data representing the underground portion and draw the target feature.

In accordance with one embodiment of the present invention, the underground portion can be a portion with a coordinate value smaller the coordinate value of the ground surface in a vertical direction, for example. Moreover, assuming that the ground surface has a height=0, a portion having a negative height coordinate value may be handled as the underground portion. Moreover, if the map data is prepared so that the underground portions are drawn by a line type such as a broken line, a dot line and the like different from that of the ground portion, the portion drawn by these lines can be determined to be the underground portion.

According to one embodiment of the present invention, even though the underground portion is not individually specified or the like, it can be handled as the target feature and drawn on the map in a state in which the underground portion can be visually recognized.

The underground portion corresponds to an underground structure such as a tunnel, an underground floor of a building, an underground shopping area, an underground parking lot or the like, for example. The underground portion may be a part of feature data which is a road such that a part of the road is a tunnel or only the underground part is prepared as an individual feature, for example.

Moreover, in the 3D map display system in accordance with one embodiment of the present invention, the map data stores determination information indicating whether or not the feature is the target feature; and the second drawing unit may be configured to identify the target feature on the basis of the determination information and to draw the target feature.

Contents of the determination information may be set in advance or can be set or changed by a user, for example.

According to one embodiment of the present invention, the target feature can be flexibly set or changed.

For the determination information, data such as a flag indicating whether it is a target feature or not or the like may be prepared for the feature data indicating each feature, respectively. Moreover, data in a format of a list of target features storing IDs of the features handled as the target features and the like may be prepared.

The determination information may be configured to be capable of individually setting by the unit of feature or a plurality of features may be configured to be capable of being set as a group.

Moreover, in the 3D map display system in accordance with one embodiment of the present invention, the map data stores a type of the feature, and the second drawing unit may be configured to identify the target feature on the basis of the type of the feature and to draw the target feature.

The types of the features include a type of features present under the ground such as underground structures including a tunnel, an underground parking lot, an underground shopping area and the like, for example.

In one embodiment of the present invention, whether or not the second drawing unit identifies any one of the types of the features as the aforementioned target feature may be set in advance or may be set or changed by a user.

According to one embodiment of the present invention, the aforementioned target features can be identified at once for each of the types of the features. Moreover, handling of the underground features can be made flexible such that, though the tunnel is drawn as the target feature, the underground parking lot is not drawn, for example.

The types of the features are not necessarily limited to the underground features and it may be a type of a feature present on the ground such as a road, for example or may be segmented types such as a national route and a prefectural route. By configuring as above, the target features can be specified by the segmented unit such that only the national routes among the roads are specified as the target features, for example.

Moreover, in the 3D map display system in accordance with one embodiment of the present invention, the second drawing unit may identify the target feature on the basis of a vertical or longitudinal position relations with respect to a reference feature specified in advance as a reference for determining the target feature so as to draw the target feature.

The types and numbers of the reference features can be arbitrarily set. Moreover, in the present invention, since the ground surface is also drawn three-dimensionally similarly to the feature, the ground surface can be also set as the reference feature.

The vertical position relation with respect to the reference feature means a vertical position relation concerning the vertical direction. For example, if the reference feature is set to the ground surface, by comparing the coordinate value of the ground surface with the coordinate value of a vertex in the vertical direction for each vertex constituting a polygon of the feature or the like, the vertical position relation with the ground surface can be grasped. Moreover, the longitudinal position relation with respect to the reference feature means whether it is on the front or on the depth in relation to the direction of the line of sight based on the view point position.

The target feature can be a feature under the reference feature or a feature in front thereof, for example. The target feature may be identified on the basis of only either one of the vertical relation and the longitudinal relation or may be specified on the basis of both of them.

In the example described above, a method of specifying the target feature side is exemplified, but the aforementioned mode specifies a side overwritten by the target feature as the reference feature. As described above, since identification of the target feature is a problem of identifying which feature is to be brought to the front and displayed with priority between the ground surface and each feature, various methods capable of relatively identifying priority in display can be employed between the ground surface and the feature.

Moreover, if the method of specifying the target feature on the basis of the longitudinal relation with respect to the reference feature is employed, the target feature can be freely varied depending on the direction of the view point position, which is a merit.

In the 3D map display system in accordance with one embodiment of the present invention, a mask image generating unit for generating a mask image by projecting only a feature specified to be drawn on the front of the target feature under the same projection condition as that of the first drawing unit is further provided, and the second drawing unit may draw the target feature while prohibiting drawing of the target feature in a portion corresponding to the mask image.

The specification the feature to be drawn on the front of the target feature can employ various modes described above for identification of the target feature.

Even in the case of the target feature, there is a case in which a part thereof is desirably displayed in a state hidden by other specific features. For example, if the target feature is a tunnel, in order to avoid such display that the tunnel is displayed on the front of the ground surface and moreover, a building looks as if it is penetrated by the tunnel, there is a case in which the building is desirably displayed on the front of the tunnel. In such a case, it is only necessary that, in the tunnel of the road, the tunnel is configured not to be displayed in a region overlapped with the building when seen from the view point.

According to the present invention, since it can be so configured that the target feature is not drawn on the portion corresponding to the mask image, the target feature can be displayed in a state in which a part thereof is hidden by other features.

In the 3D map display system in accordance with one embodiment of the present invention, instead of the aforementioned mask image generating unit, a third drawing unit may be provided for drawing only a feature specified to be drawn on the front of the target feature so as to be overwritten on a drawing result by the second drawing unit without executing depth determination with respect to the drawing result by the second drawing unit.

The third drawing unit may draw a specified feature (hereinafter referred to as a specified feature) directly on the drawing result by the first drawing unit and the second drawing unit, or a layer on which the specified feature is drawn is generated separately from the drawing result by the first drawing unit and the second drawing unit and this may be superposed on the drawing result by the first drawing unit and the second drawing unit. The third drawing unit draws a feature by executing depth determination between the specified features.

According to one embodiment of the present invention, too, display can be made in a state in which a part of the target feature is hidden by other features.

In this mode, too, the specified feature can employ the various methods described above for specification of the target feature. However, since the third drawing unit draws the specified feature by ignoring the depth relation with the first drawing unit and the second drawing unit, if there are a large number of the specified features, a depth feeling as the 3D map can be lost largely. As a method for avoiding such obstruction, a method can be employed that the specified feature drawn by the third drawing unit is made capable of individual specification by using the determination information described above.

In the 3D map display system in accordance with one embodiment of the present invention, the second drawing unit may be configured to draw the target feature by executing the depth determination between the target features.

By configuring as above, if a plurality of the aforementioned target features drawn by the second drawing unit are overlapped when seen from a view point, the depth relation between the target features can be displayed clearly. For example, if a tunnel is the target feature, at a spot where there are a plurality of tunnels, by drawing the target features by executing the depth determination between these tunnels, such display that the position relation of these tunnels can be grasped can be realized.

The present invention does not have to comprise all the aforementioned various characteristics but a part of them can be omitted or combined as appropriate in configuration. Moreover, the present invention can be configured as an invention of a 3D map display method other than the configuration as the aforementioned 3D map display system. Moreover, the present invention can be realized in various modes such as a computer program for realizing them and a recording medium recording the program, a data signal including the program and embodied in a carrier wave and the like. In each of the modes, it is possible to apply the various additional elements illustrated above.

When the present invention is configured as the computer program or the recording medium or the like recording the program, it may be configured as an entire program for controlling an operation of the 3D map display system or only a portion performing the function of the present invention may be configured. Moreover, as the recording medium, various computer-readable mediums such as a flexible disk, CD-ROM, DVD-ROM, a magneto-optical disk, an IC card, a ROM cartridge, a punch card, a printed matter on which a code such as barcode is printed, an internal storage device of a computer (a memory such as a RAM and a ROM), and an external storage device can be used.

DETAILED DESCRIPTION OF EMBODIMENTS OF THE INVENTION

Modes for carrying out the present invention will be described below on the basis of embodiments.

A. System Configuration

Figure 1:
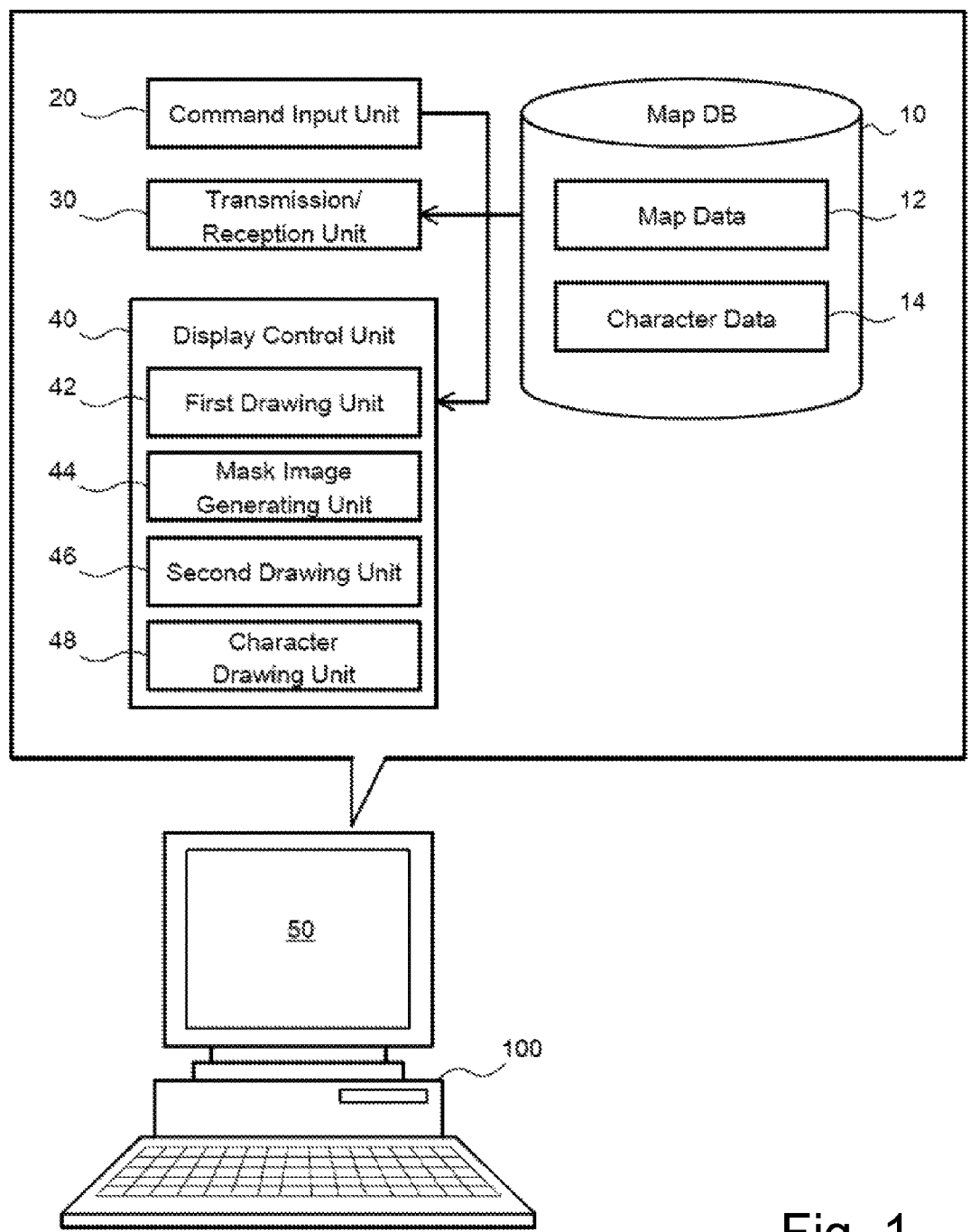
FIG. 1 is an explanatory diagram illustrating an outline configuration of a 3D map display system 100 of a first embodiment.

FIG. 1 is an explanatory diagram illustrating an outline configuration of a 3D map display system 100 of a first embodiment. As illustrated, the 3D map display system 100 comprises a map database (DB) 10, a command input unit 20, a transmission/reception unit 30, a display control unit 40, and a display apparatus 50. Each of these functional blocks can be configured in a software manner by installing a computer program for realizing the respective functions in a personal computer comprising a CPU, a RAM, a ROM, a hard disk drive, a communication apparatus and the like. At least a part of these functional blocks may be configured in a hardware manner In the map database 10, map data 12 and character data 14 are stored.

The map data 12 is data for displaying a 3D map and includes 3D models (polygons or lines) representing 3D shape of various features such as sea, mountain, river, road, building and the like and a ground surface. Contents of the map data 12 will be described later.

The character data 14 is data representing a character drawn in the 3D map, that is, a name of a building, a name of a road, a name of an intersection and the like, for example. The character data 14 is associated with the map data 12. The character data 14 also includes data describing a display position of each character in the 3D map, a font and a size of a character, a relation between a scale of the 3D map and display/non-display of a character and the like.

The command input unit 10 receives an input of an instruction by a user relating to display of the 3D map and the like. The command input unit 10 receives inputs of the scale of the 3D map, a view point position, a direction of the line of sight and the like, for example.

The transmission/reception unit 30 transacts data with other apparatuses via a network, not shown. The transmission/reception unit 30 receives the map data 12 and the character data 14 from other apparatuses and updates the map database 10 or outputs the 3D map generated by the display control unit 40 to a printer, for example.

The display control unit 40 comprises a first drawing unit 42, a mask image generating unit 44, a second drawing unit 46, and a character drawing unit 48.

The first drawing unit 42 executes depth determination and hidden-surface processing using the map data 12 read out of the map database 10 and draws the ground surface and the feature.

The mask image generating unit 44 generates a mask image for partially prohibiting drawing of a feature by the second drawing unit 46 by using the map data 12. In this embodiment, the mask image generating unit 44 generates a mask image for prohibiting drawing of an underground feature in a region overlapped with a building on the ground when seen from a view point by projecting only a 3D model of the building on the ground under the same projection condition as that of the first drawing unit 42 as will be described later.

The second drawing unit 46 draws a target feature, which is a feature in which at least a part thereof is hidden by a ground surface or other features in the drawing by the first drawing unit 42, by overwriting the target feature on the drawing result by the first drawing unit 42 by using the map data 12 without executing the depth determination and the hidden-surface processing with respect to a drawing result by the first drawing unit 42. In this embodiment, the second drawing unit 46 is configured to draw the target feature over the drawing result by the first drawing unit 42. The second drawing unit 46 generates a layer on which the target feature is drawn separately from the drawing result by the first drawing unit 42 and may superpose it on the drawing result by the first drawing unit 42. The second drawing unit 46 draws the target feature by executing the depth determination and the hidden-surface processing between the target features.

The character drawing unit 48 draws a character on the 3D map by using the character data 14 read out of the map database 10.

The display control unit 40 controls operations of the first drawing unit 42, the mask image generating unit 44, the second drawing unit 46, and the character drawing unit 48 and displays the 3D map drawn by them on the display apparatuses 50.

B. Map Data

Figure 2:
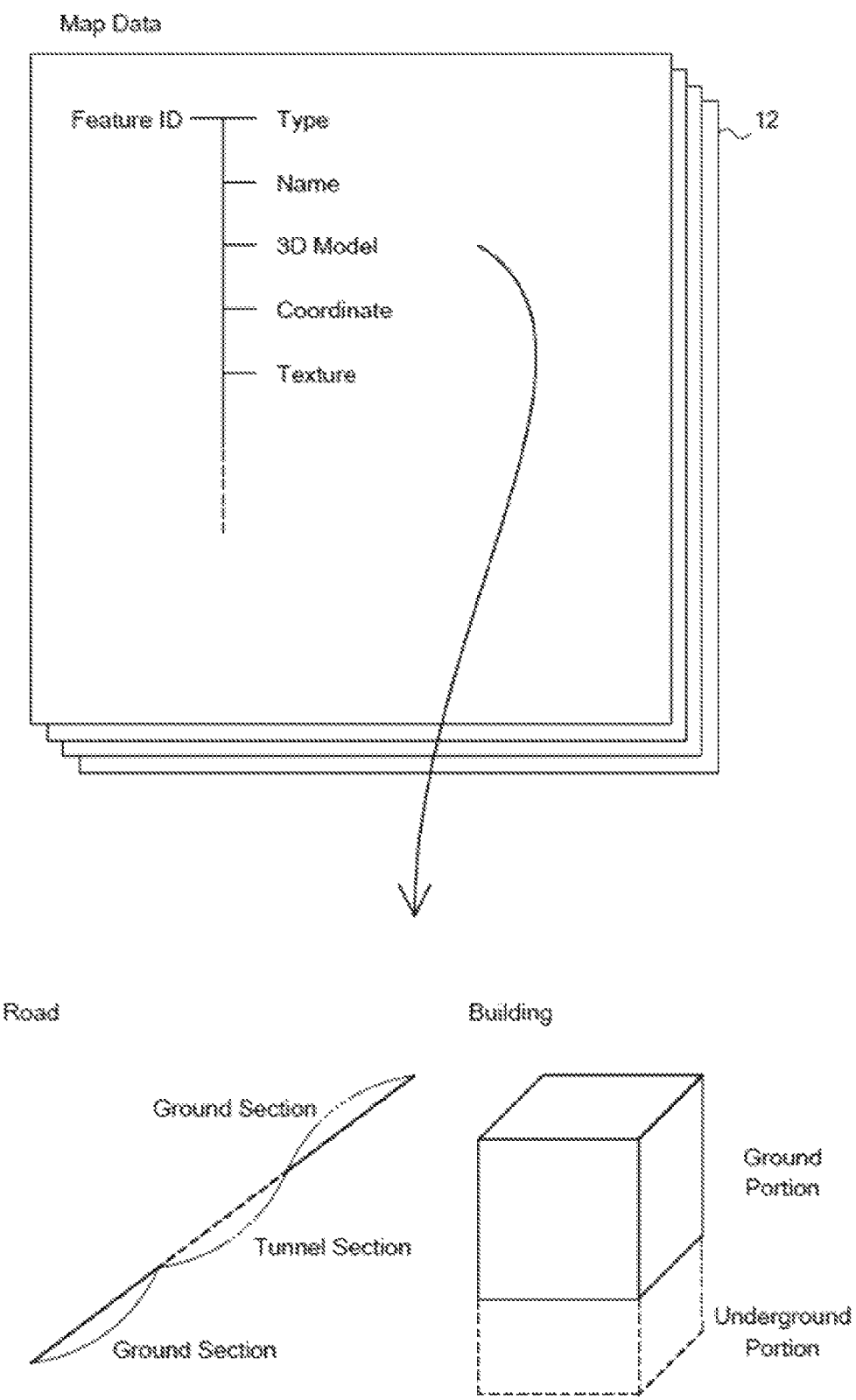
FIG. 2 is an explanatory diagram illustrating contents of map data 12.

FIG. 2 is an explanatory diagram illustrating contents of the map data 12. As illustrated, in the map data 12, a feature ID specific to each feature is given, and various types of data are managed for each feature. Moreover, in this embodiment, in the map data 12, the ground surface is divided in a mesh state, and a specific ID is given to each of them similarly to the features and is managed.

The "type" means the types of the features such as sea, mountains, rivers, roads, railways, buildings and the like. In the road and the railway, a ground section (ground portion) and a tunnel section (underground portion) are both managed as one feature, and a sub type indicating that it is an underground structure is assigned to the tunnel section. Moreover, in a building, a ground portion and an underground portion are both managed as one feature, and a sub type indicating that it is an underground structure is assigned to the underground portion of the building. Moreover, for the underground structure such as an underground parking lot, an underground shopping area and the like, a type indicating that it is an underground structure is assigned. In the road or the railway, the ground section and the underground section may be managed as separate features. Moreover, in the building, too, the ground portion and the underground portion may be managed as separate features. A type of the ground surface is assigned to the map data 12 of the ground surface.

The "name" is a name of the feature.

The "3D model" is polygon data for displaying a ground surface and each feature three-dimensionally or line data for displaying a road or a railway. In this embodiment, it is specified that the ground feature and the ground portion of the feature are drawn by solid lines, while the underground portion of the feature and the underground structure are drawn by broken lines. For example, as illustrated on a lower part of FIG. 2, the ground section of the road is drawn by a solid line and the tunnel section is drawn by a broken line. Moreover, the ground portion of the building is drawn by a solid line, while the underground portion is drawn by a broken line. Hereinafter, the ground features and the ground portions of the features altogether are also referred to as ground features. Moreover, the underground portions of the features and the underground structures altogether are also referred to as the underground features.

The "coordinate" is coordinate data of each vertex of the 3D model (polygon data or line data).

The "texture" is an image pasted in accordance with a shape of the feature (3D model) in texture mapping. In this embodiment, since the underground features are drawn transparently, a texture of the underground feature is not prepared.

C. 3D Map Display Processing

Figure 3:
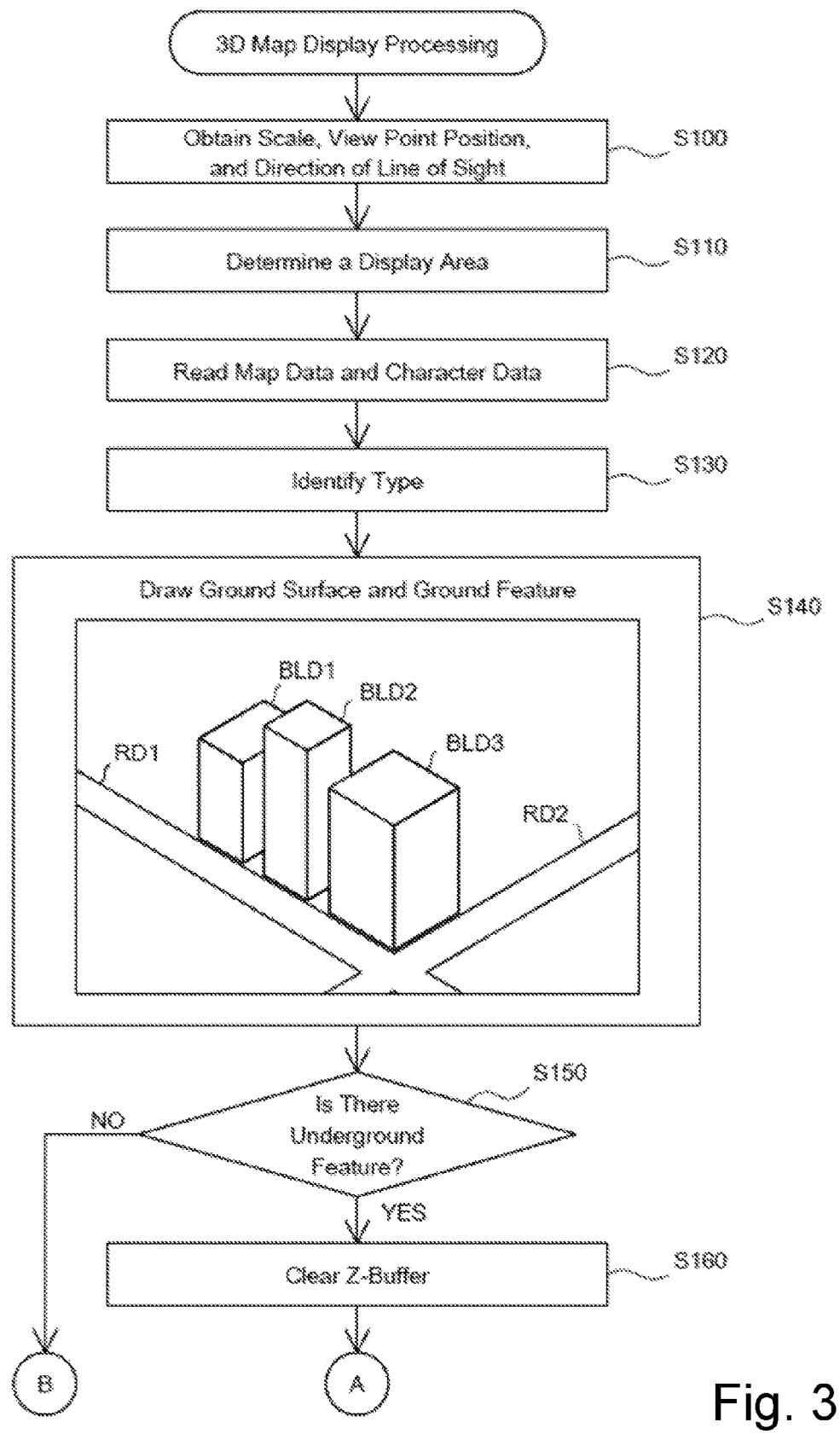
FIG. 3 is a flowchart illustrating a flow of 3D map display processing of the first embodiment.
Figure 4:
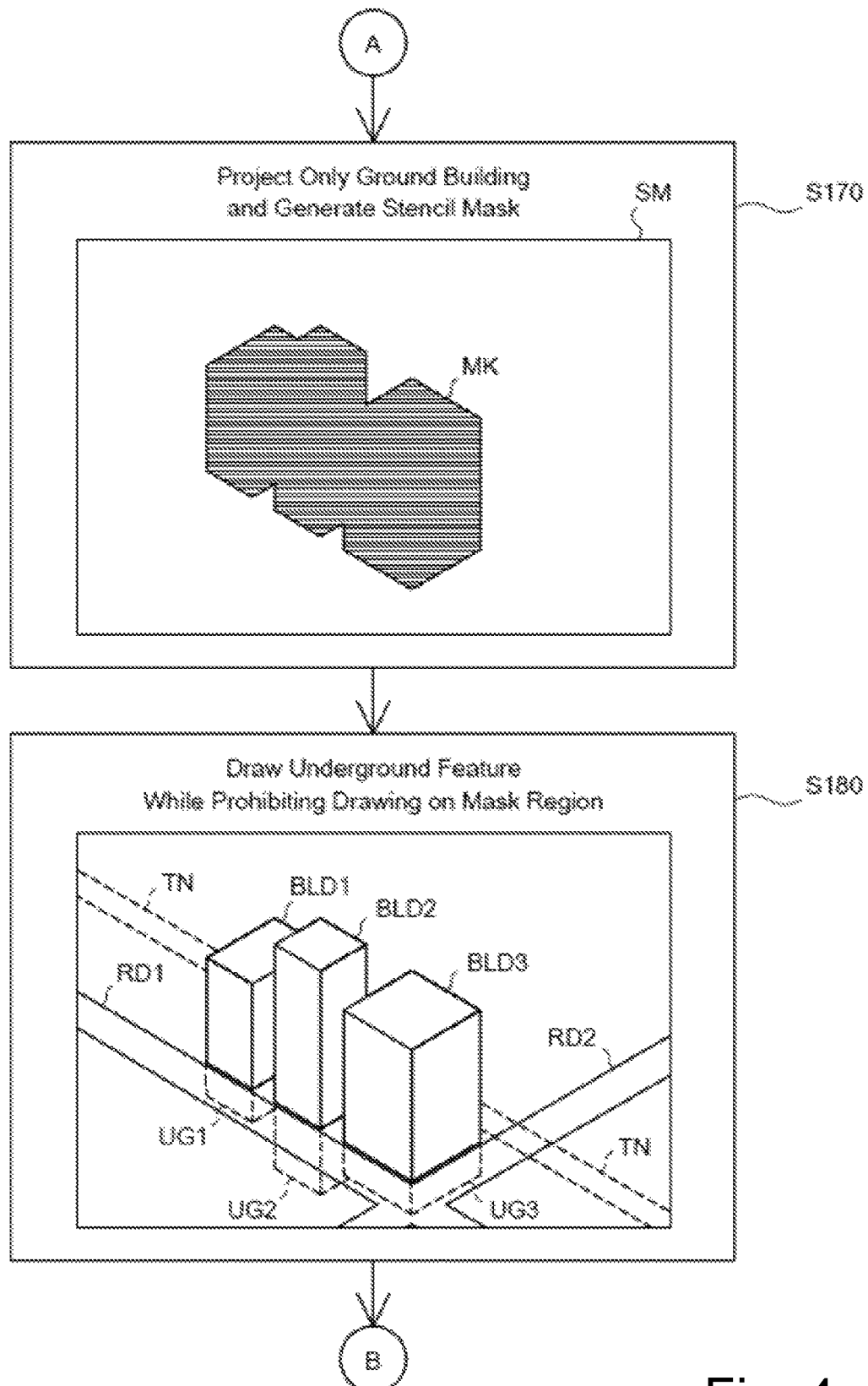
FIG. 4 is a flowchart illustrating the flow of the 3D map display processing of the first embodiment.
Figure 5:
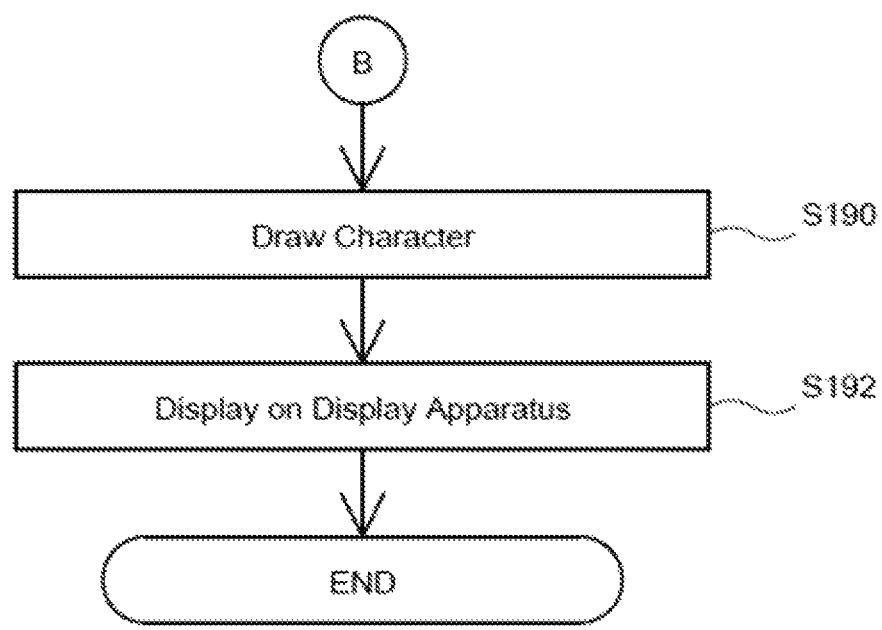
FIG. 5 is a flowchart illustrating a flow of 3D map display processing of the first embodiment.

FIGS. 3 to 5 are flowcharts illustrating flows of the 3D map display processing of the first embodiment. This processing is executed by the 3D map display system 100 when a display instruction of the 3D map is input.

When the processing is started, the 3D map display system 100 obtains the scale, the view point position, and the direction of the line of sight of the 3D map specified by the user (Step S100). Then, the 3D map display system 100 determines a display area on the basis of the obtained scale, the view point position, and the direction of the line of sight of the 3D map (Step S110) and reads the map data 12 and the character data 14 for the ground surface and the feature present in the display area (Step S120).

Subsequently, the 3D map display system 100 identifies the type of each map data 12 (Step S130), extracts features without the sub type of the "underground structure", that is, the ground surfaces and the ground features, executes the depth determination and the hidden-surface processing by using a Z-buffer (depth buffer), and performs drawing (Step S140) (hereinafter this drawing result shall be called "normal drawing"). In a frame at Step S140, a 3D map in which the ground surface and roads RD1 and RD2 and buildings BLD1, BLD2, and BLD3 are drawn as the ground features is illustrated. In this embodiment, the road is constituted by the ground portion and the tunnel as one feature data, and the building is also constituted by the ground portion and the underground portion as one feature data. In the processing at Step S140, only the vertexes and polygons corresponding to the ground features are extracted from these pieces of feature data and drawn.

In the drawing with the depth determination, the underground feature is hidden by the ground surface and is not drawn and thus, it may be so configured that the processing of extracting only the ground features is omitted in the processing at Step S140, and all the features are to be drawn.

Subsequently, the 3D map display system 100 determines whether or not there is an underground feature in the display area on the basis of the identification result at Step S130 (Step S150). If there is no underground feature in the display area (Step S150: NO), the 3D map display system 100 proceeds the processing to Step S190. On the other hand, if there is an underground feature in the display area (Step S150: YES), the 3D map display system 100 clears the Z-buffer before drawing the underground feature (Step S160). As a result, in the subsequent drawing processing of the underground features, the depth determination and the hidden-surface processing are not executed with the drawing result (normal drawing) at Step S140.

For the extraction of the underground feature at Step S150, a method other than the type may be employed. For example, in this embodiment, it is specified that the ground feature is drawn by a solid line and the underground feature is drawn by a broken line and thus, the underground feature may be extracted on the basis of the type of lines used for drawing. Besides, it may be also extracted on the basis of characteristics on the data representing the underground features such as presence of a texture.

Subsequently, the 3D map display system 100 draws the underground feature by overwriting it on the normal drawing. When the underground feature is drawn, the depth determination is not executed with respect to the normal drawing and thus, depending on the position relation between the underground feature and the ground building, the ground building might be hidden by the underground feature. Thus, in this embodiment, in order to avoid such a state, the underground feature shall not be displayed on a portion where the ground building is drawn. In other words, the underground feature is drawn as if the depth determination is executed between the ground building and the underground feature. Thus, the 3D map display system 100 projects only the ground building under the same projection condition as that at Step S140 prior to the drawing of the underground feature and generates a stencil mask SM as a mask image (Step S170). In a frame at Step S170, a stencil mask SM having a mask region MK generated by projecting only the ground buildings BLD1, BLD2, and BLD3 is illustrated. The mask region MK in the stencil mask SM is illustrated by being painted in black. Specification of the feature to be projected when the stencil mask SM is generated can be arbitrarily changed.

Then, the 3D map display system 100 extracts the underground feature on the basis of the identification result at Step S130 and draws the extracted underground feature by overwriting it on the drawing result at Step S140 while prohibiting drawing on the mask region MK overlapped with the ground buildings BLD1, BLD2, and BLD3 by the stencil mask SM (Step S180). That is, when the underground feature is drawn, it is determined whether or not each pixel corresponds to the stencil mask SM and only if it does not correspond to the stencil mask SM, drawing to that pixel is allowed. In a frame at Step S180, a 3D map drawn by overwriting a tunnel TN of the road and underground portions UG1, UG2, and UG3 of the buildings BLD1, BLD2, and BLD3 as the underground features. As illustrated, in this embodiment, only profile lines shall be drawn by a broken line in the underground features is illustrated. As described above, in this embodiment, the tunnel TN is a part of the road, and the 3D model of the road is managed by the line data. Thus, when the tunnel TN is to be drawn, the 3D map display system 100 polygonizes it with a width according to the scale, the view point position, and the direction of the line of sight of the 3D map obtained at Step S100 given to the line data and draws its edge by a broken line. By drawing the underground feature by using the stencil mask SM generated by projecting only the buildings BLD1, BLD2, and BLD3, the underground feature can be displayed as if the depth determination is executed between the ground buildings BLD1, BLD2, and BLD3 and the underground features.

At Step S180, the 3D map display system 100 executes the depth determination and the hidden-surface processing for the underground features with each other. In the illustrated example, a part of the underground portion UG2 of the building BLD2 is hidden by the underground portion UG3 of the building BLD3 on the front thereof. As a result, if a plurality of the underground features are overlapped when seen from the view point, the position relation between the underground features can be clearly displayed.

Subsequently, the 3D map display system 100 draws a character in the 3D map (Step S190) and displays the 3D map on the display apparatuses 50 (Step S192).

Then, the 3D map display system 100 finishes the 3D map display processing.

According to the 3D map display processing of the first embodiment described above, the underground features can be drawn. Therefore, obstructions in drawing of a 3D map caused by the depth determination can be alleviated, and position relations among various features can be grasped easily.

D. Second Embodiment

Configuration of a 3D map display system 100 of a second embodiment is the same as the configuration of the 3D map display system 100 of the first embodiment. The 3D map display system 100 of the second embodiment is different from the first embodiment in a part of contents of the 3D map display processing. That is, in the first embodiment, in the 3D map display processing, the underground features are extracted by identifying the type of each feature by referring to the map data 12, but in the second embodiment, the underground feature is extracted by analyzing a coordinate of a vertex of each feature. The 3D map display processing of the second embodiment will be described below.

Figure 6:
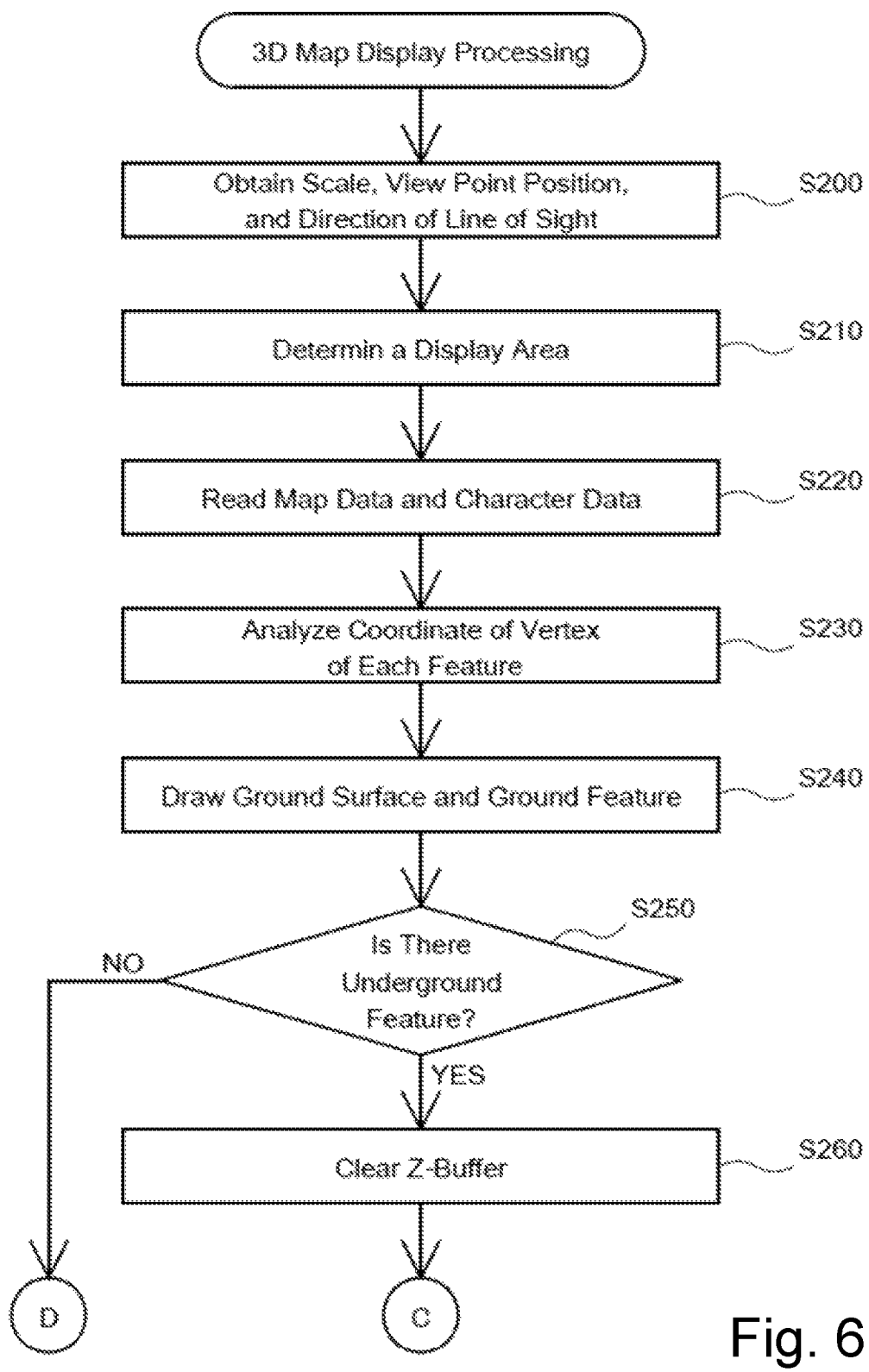
FIG. 6 is a flowchart illustrating the flow of the 3D map display processing of a second embodiment.
Figure 7:
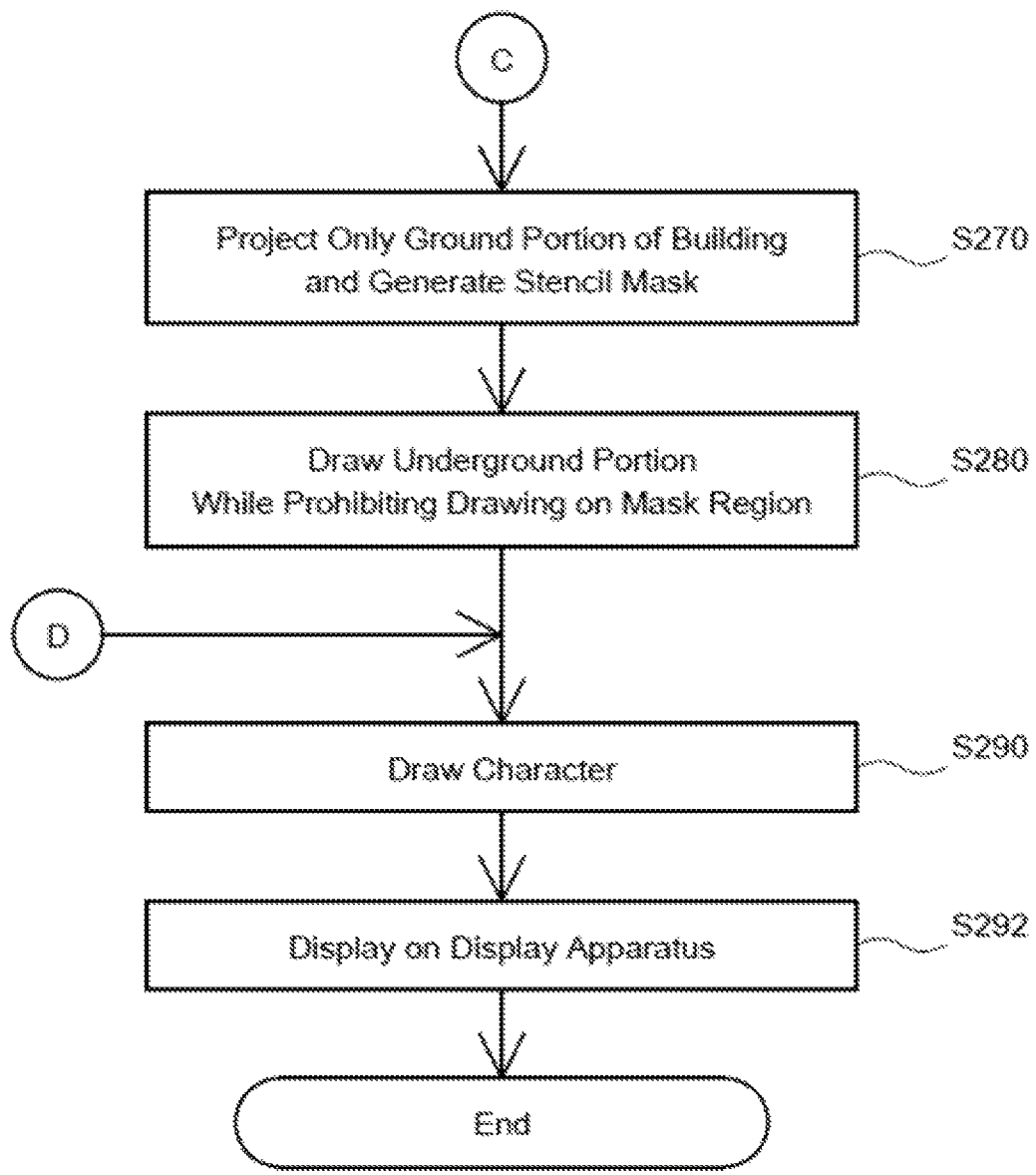
FIG. 7 is a flowchart illustrating the flow of the 3D map display processing of the second embodiment.

FIGS. 6 and 7 are flowcharts illustrating flows of the 3D map display processing of the second embodiment. This processing is executed by the 3D map display system 100 when a display instruction of the 3D map is input.

When the processing is started, the 3D map display system 100 executes obtaining of the scale, the view point position, and the direction of the line of sight (Step S200), determination of the display area (Step S210), and reading-in of the map data 12 and the character data 14 (Step S220). The processing is similar to that in the first embodiment.

Subsequently, the 3D map display system 100 analyzes the coordinate of the vertex of each feature by referring to the map data 12 (Step S230). In this embodiment, a coordinate value of the ground surface and a coordinate value of the vertex are compared in the vertical direction for each vertex of the polygon or the line representing the feature. If the coordinate value of the vertex is larger than the coordinate value of the ground surface, it can be determined that the vertex is a vertex of the ground feature, while if the coordinate value of the vertex is smaller than the coordinate value of the ground surface, it can be determined that the vertex is a vertex of the underground feature. Then, the 3D map display system 100 extracts the ground portion of the feature on the basis of this analysis result, executes the depth determination and the hidden-surface processing by using the Z-buffer and draws the ground surface and the extracted ground portion (Step S240).

The processing below is the same as that of the first embodiment. That is, if there is an underground feature (STEP S250: YES), the 3D map display system 100 clears the Z-buffer (Step S260), generates the stencil mask SM (Step S270), and draws the underground feature by using this (Step S280). If there is no underground feature (Step S250), the processing at these steps is skipped. After that, the 3D map display system 100 draws characters (Step S290) and displays the 3D map (Step S292).

According to the second embodiment described above, the underground feature can be drawn even without setting a type indicating the underground feature.

E. Third Embodiment

Configuration of a 3D map display system 100 of a third embodiment is configuration excluding the mask image generating unit 44 from the configuration of the 3D map display system 100 of the first embodiment. The 3D map display system 100 of the third embodiment is different from the first embodiment in a part of contents of the map data 12 stored in the map database 10 and the 3D map display processing. The contents of map data 12*a* and the 3D map display processing in the third embodiment will be described below.

Figure 8:
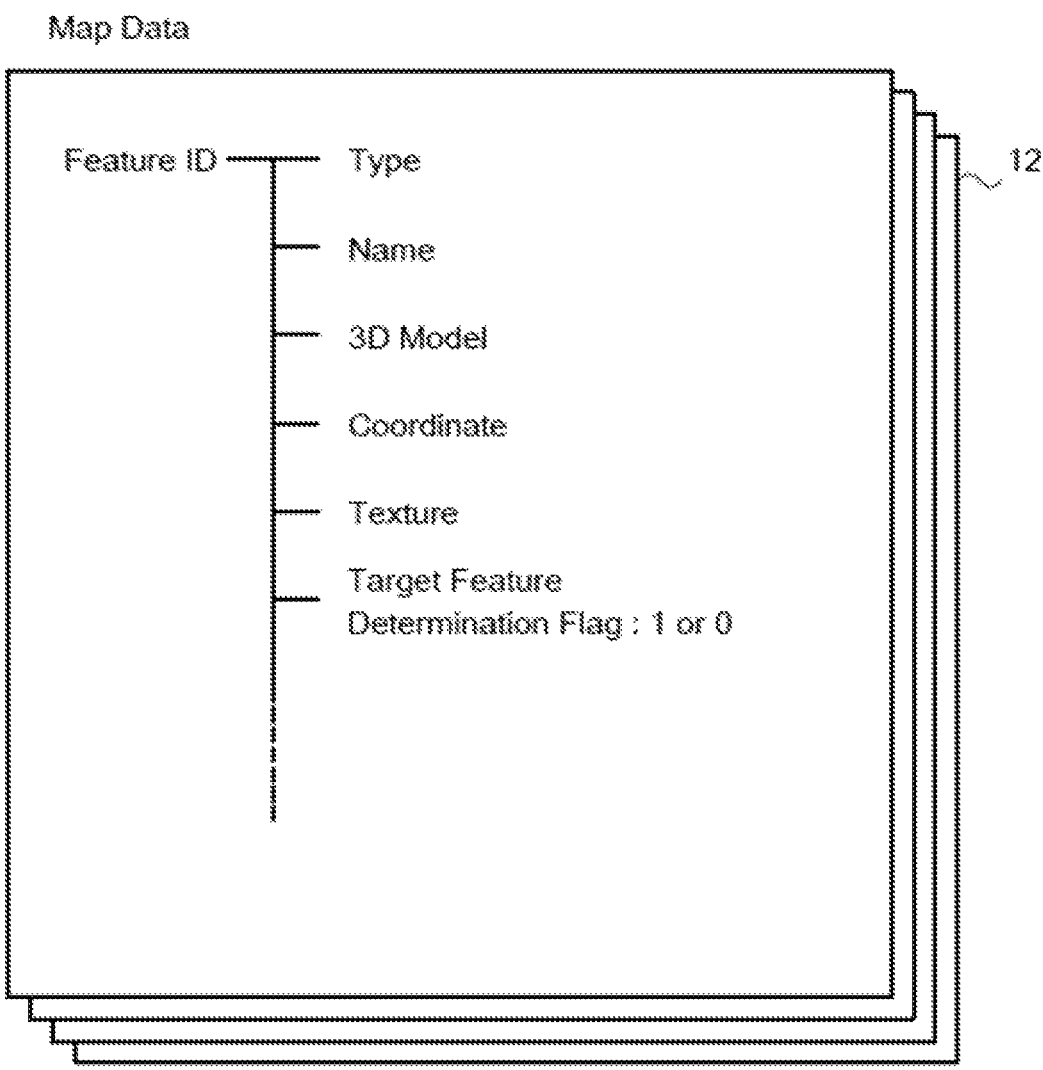
FIG. 8 is an explanatory diagram illustrating contents of map data 12a in a third embodiment.

FIG. 8 is an explanatory diagram illustrating the contents of the map data 12*a* in the third embodiment. In the map data 12*a* in the third embodiment, a "target feature determination flag" is given to each feature. The "target feature determination flag" is determination information indicating whether or not the feature is a drawing target by the second drawing unit 46, that is, whether or not it is a target to be drawn after the Z-buffer is cleared, and the flag is set to "1" if the feature is the drawing target, while the flag is set to "0" if not.

The "target feature determination flag" may be set in advance by a provider of the map data 12*a* or may be settable or changeable by the user. In this embodiment, the drawing target by the second drawing unit 46 can be individually set or changed in a flexible manner.

Figure 9:
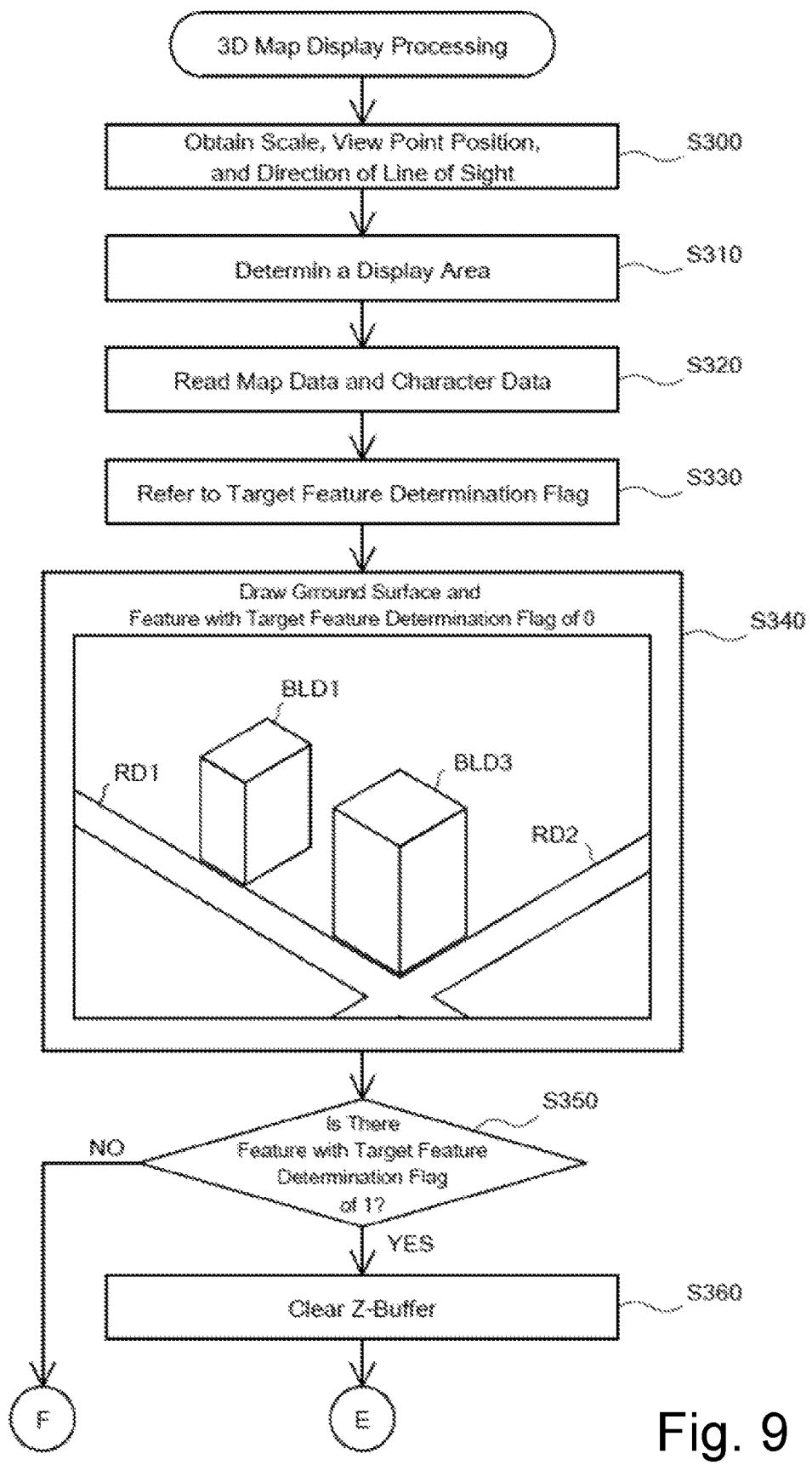
FIG. 9 is a flowchart illustrating a flow of the 3D map display processing of the third embodiment.
Figure 10:
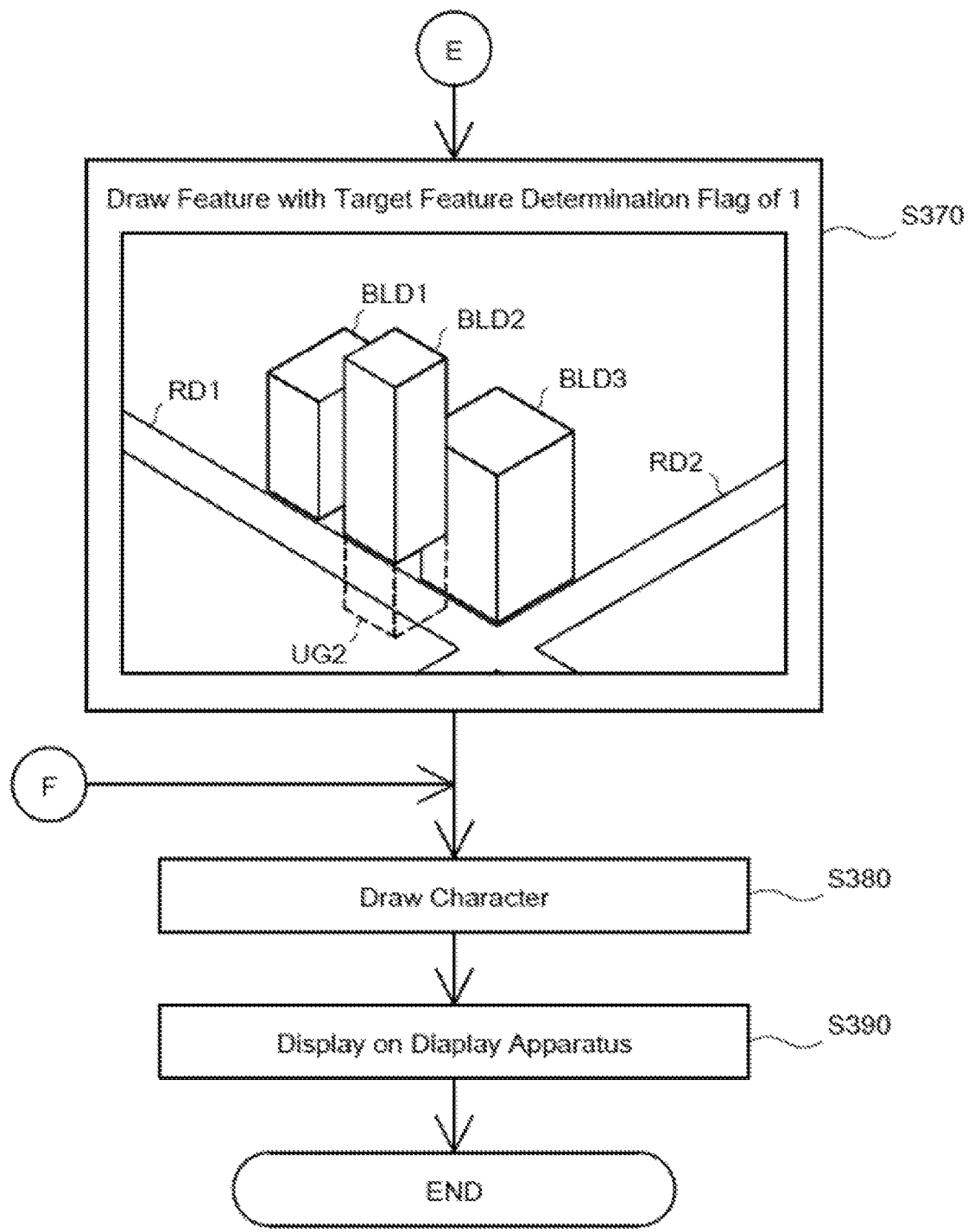
FIG. 10 is a flowchart illustrating the flow of the 3D map display processing of the third embodiment.

FIGS. 9 and 10 are flowcharts illustrating flows of the 3D map display processing of the third embodiment. This processing is executed by the 3D map display system 100 when a display instruction of the 3D map is input.

When the processing is started, the 3D map display system 100 executes obtaining of the scale, the view point position, and the direction of the line of sight (Step S300), determination of the display area (Step S310), and reading-in of the map data 12 and the character data 14 (Step S320). The processing is similar to those in the first embodiment.

Subsequently, the 3D map display system 100 refers to the target feature determination flag in the map data 12 (Step S330) and draws the feature with the target feature determination flag of "0" and the ground surface by executing the depth determination and the hidden-surface processing by using the Z-buffer (Step S340). In a frame at Step S340, a 3D map on which the ground surface and the roads RD1 and RD2 and the buildings BLD1, BLD2, and BLD3 as the feature with the target feature determination flag of "0" are drawn is illustrated.

Subsequently, if the feature with the target feature determination flag of "1" is present in the display area (Step S350: YES), the 3D map display system 100 clears the Z-buffer (Step S360), draws the feature by overwriting it on the drawing result at Step S340 (Step S370), draws the character (Step S380), and displays the result on the display apparatuses (Step S390).

In a frame at Step S370, a 3D map in which the building BLD 2 as the feature with the target feature determination flag of "1" and its underground portion UG2 are drawn by overwriting is illustrated. As a result, the building BLD2 and the underground portion UG2 can be displayed with more priority than the other features such as the building BLD3. For example, since such display can be made that the building BLD2 can be visually recognized immediately in the 3D map, if the building BLD2 is a destination specified by the user or if it is a landmark, the display becomes usable.

In this embodiment, since the target feature determination flag is set for each feature as illustrated in FIG. 8, the building BLD2 and the underground portion UG2 are integrated and drawn with priority. For example, in the case of the building BLD2, if the depth determination is executed as usual and drawing is performed and only the underground portion UG2 is to be drawn later, it may be so configured that the building BLD2 and the underground portion UG2 are separated to separate feature data, and the target feature determination flag is set for each of them. Moreover, instead of this kind of method, as the sub type can be set in the first embodiment, it may be such a structure in which the target feature determination flag can be set for each constitution portion of a part of the feature data.

F. Fourth Embodiment

In the 3D map display system 100 of the first embodiment, the stencil mask SM is used in the 3D map display processing, and the underground feature is drawn while drawing on the mask region MK is prohibited. On the other hand, a 3D map display system 100A of a fourth embodiment displays at least a part of an underground feature hidden by a ground building by drawing the entire underground feature by overwriting it on the drawing result of the ground feature and by drawing only the ground building by overwriting it on the drawing result.

Figure 11:
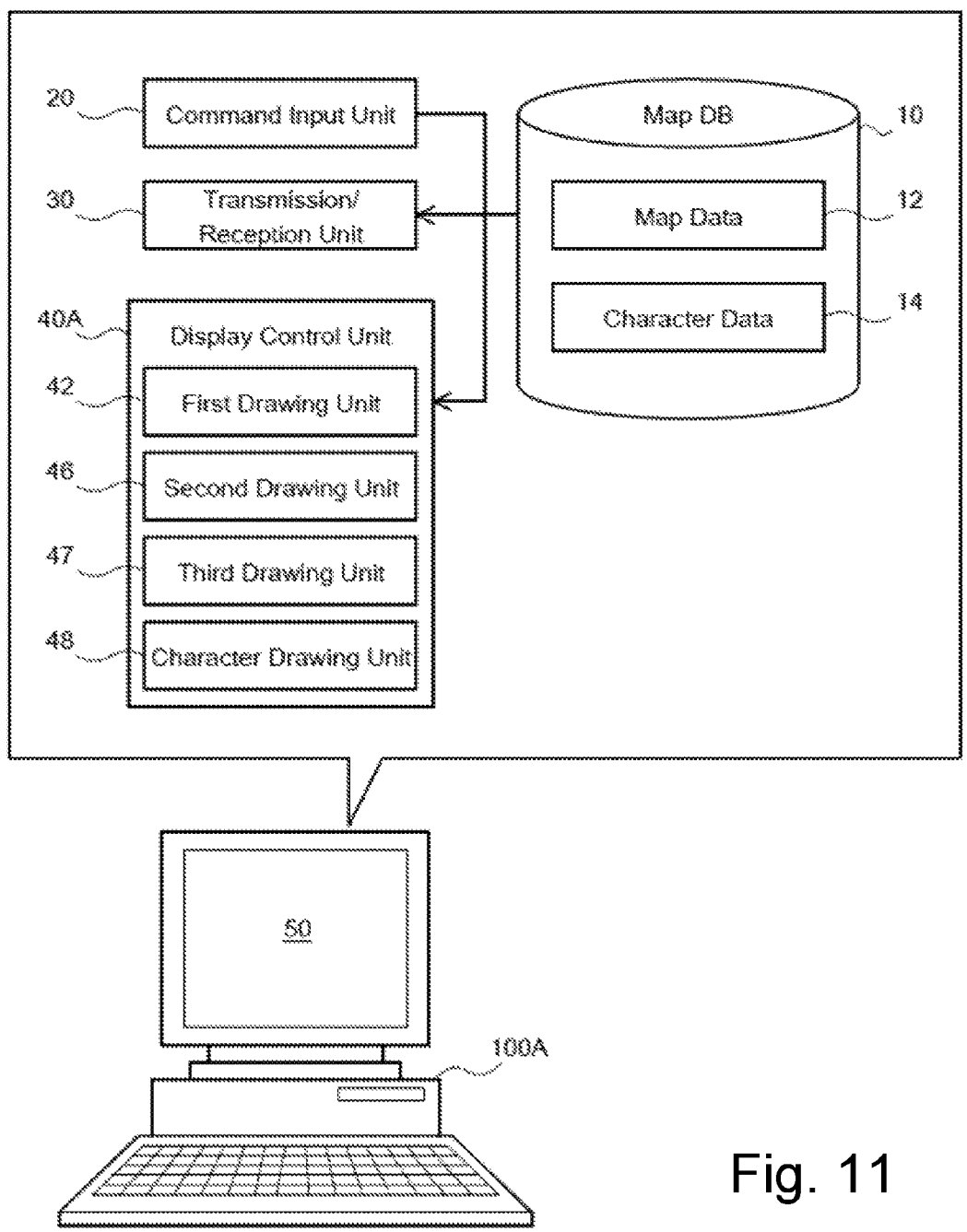
FIG. 11 is an explanatory diagram illustrating an outline configuration of a 3D map display system 100A of a fourth embodiment.

FIG. 11 is an explanatory diagram illustrating an outline configuration of the 3D map display system 100A of the fourth embodiment. The 3D map display system 100A of the fourth embodiment comprises a display control unit 40A instead of the display control unit 40 in the 3D map display system 100 of the first embodiment illustrated in FIG. 1. The display control unit 40A comprises a third drawing unit 47 instead of the mask image generating unit 44 in the display control unit 40. The others are the same as those in the 3D map display system 100 of the first embodiment.

The third drawing unit 47 draws only the ground building (ground portion of a building) so as to overwrite it on the drawing result by the second drawing unit 46. In this embodiment, the third drawing unit 47 generates a layer on which only the ground building is drawn separately from the drawing result by the first drawing unit 42 and the second drawing unit 46 and superposes it on the drawing result by the first drawing unit 42 and the second drawing unit 46. The third drawing unit 47 may perform drawing by overwriting the ground building on the drawing result by the first drawing unit 42 and the second drawing unit 46.

Figure 12:
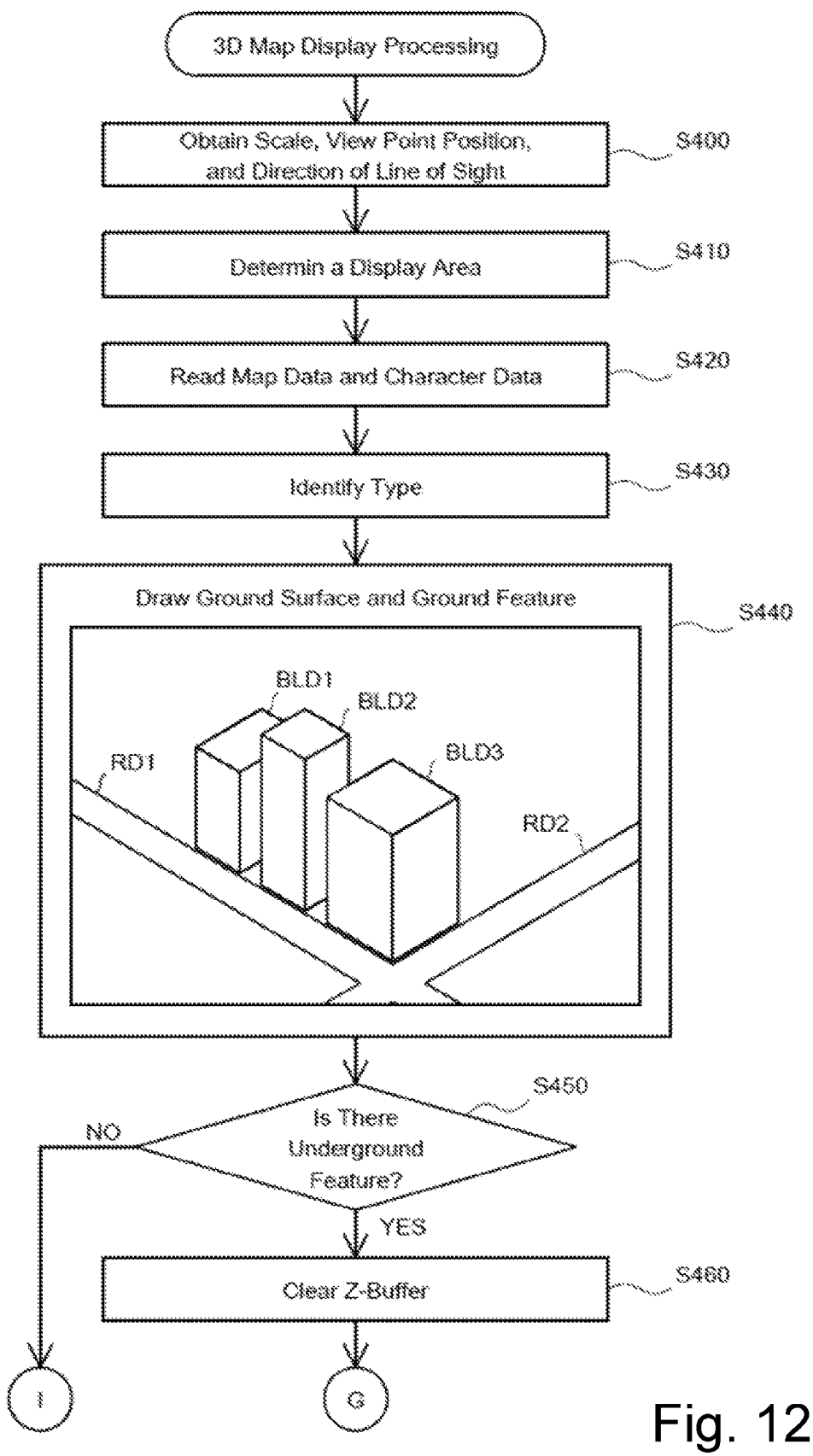
FIG. 12 is a flowchart illustrating a flow of 3D map display processing of the fourth embodiment.
Figure 13:
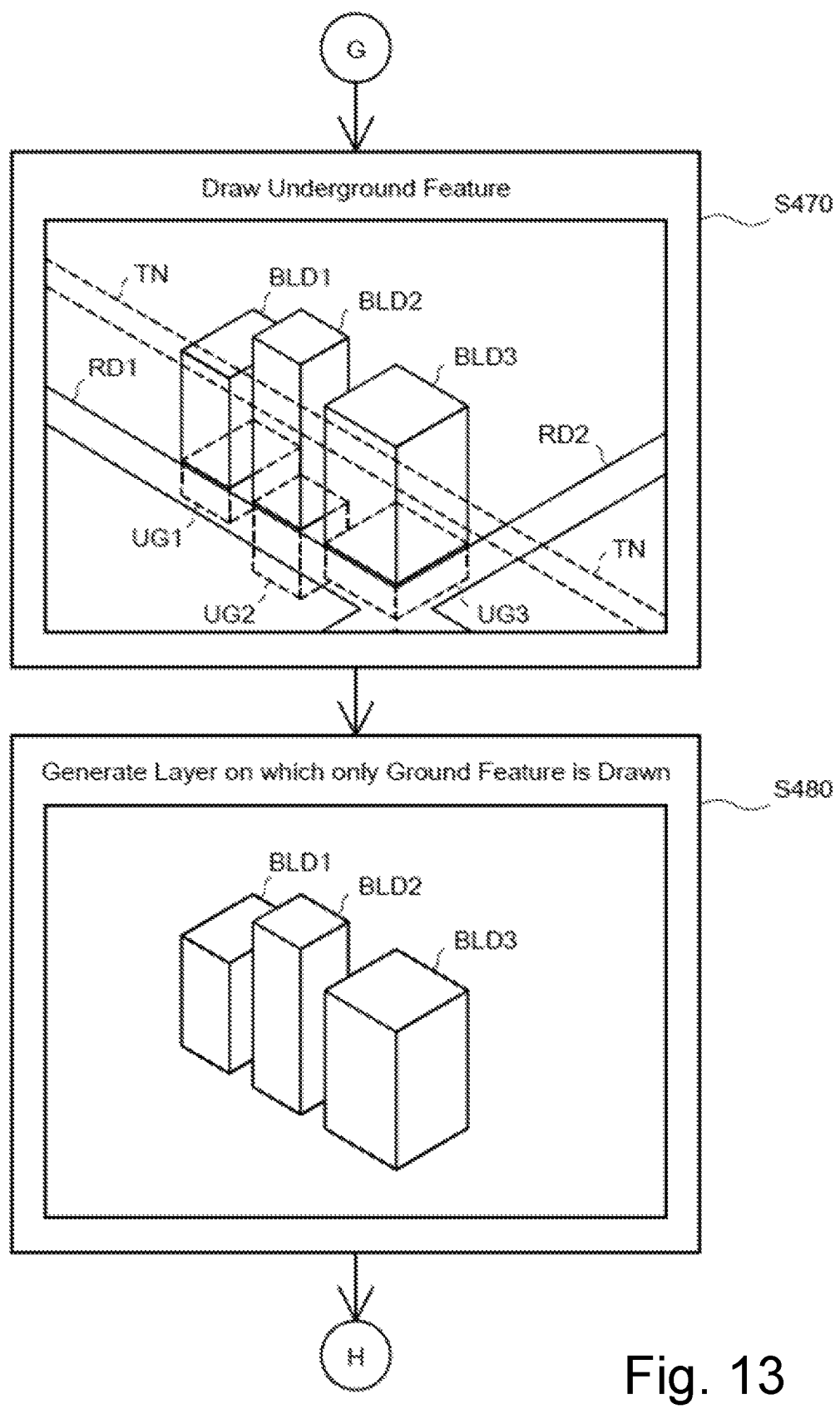
FIG. 13 is a flowchart illustrating the flow of the 3D map display processing of the fourth embodiment.
Figure 14:
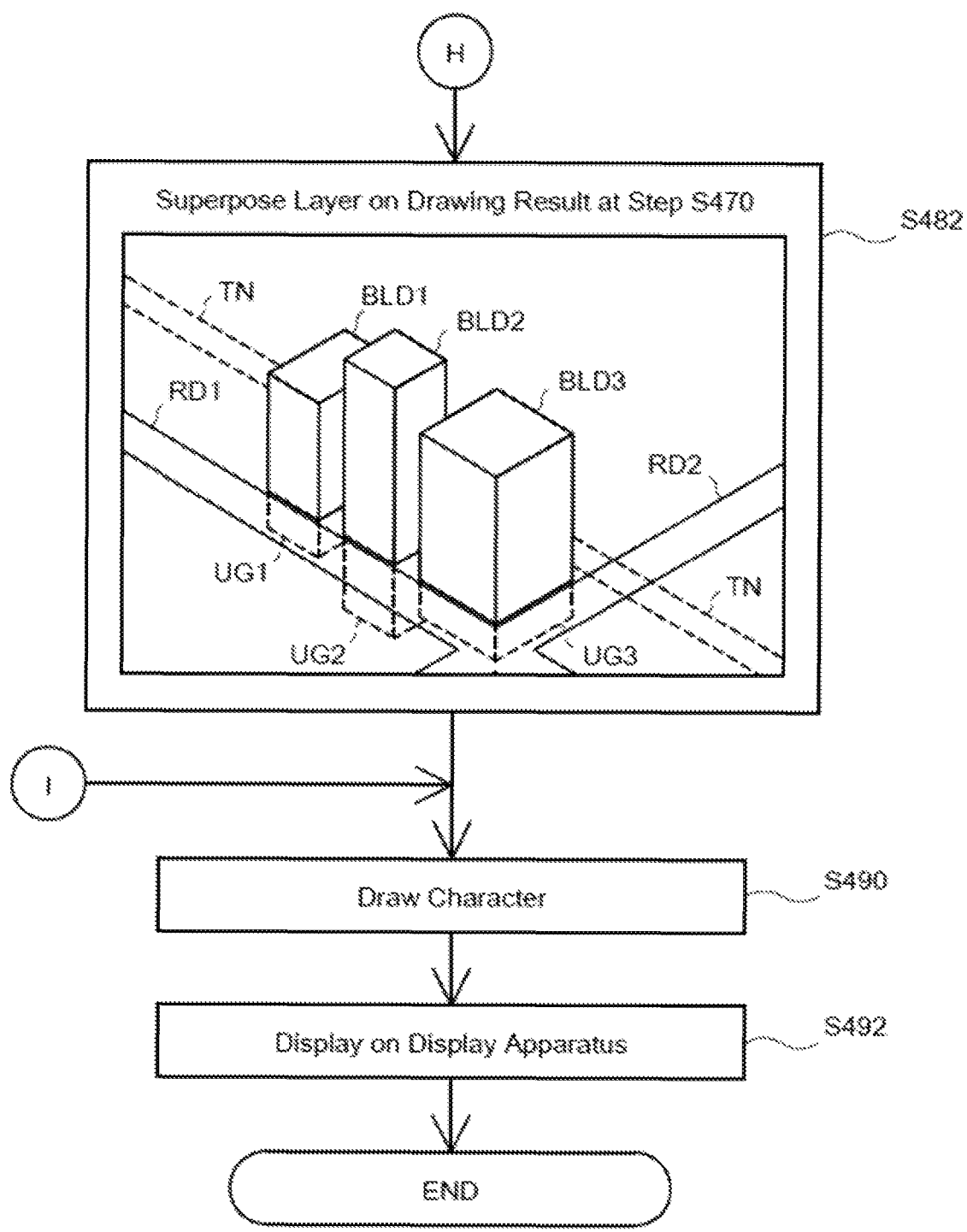
FIG. 14 is a flowchart illustrating the flow of the 3D map display processing of the fourth embodiment.

FIGS. 12 to 14 are flowcharts illustrating flows of the 3D map display processing of the fourth embodiment. This processing is executed by the 3D map display system 100A when a display instruction of a 3D map is input.

When the processing is started, the 3D map display system 100A executes obtaining of the scale, the view point position, and the direction of the line of sight (Step S400), determination of the display area (Step S410), and reading-in of the map data 12 and the character data 14 (Step S420). The processing in these steps is similar to those in the first embodiment.

Moreover, the 3D map display system 100A identifies the type of each map data 12 (Step S430) similarly to the first embodiment, extracts the ground surfaces and the ground features, executes the depth determination and the hidden-surface processing by using the Z-buffer, and draws the extracted ground surface and ground features (Step S440).

Subsequently, if there is an underground feature in the display area (Step S450: YES), the 3D map display system 100A clears the Z-buffer (Step S460) and draws the underground feature by overwriting it on the drawing result at Step S440 (Step S470). The processing contents are the same as those of the first embodiment except generation of the stencil mask SM is omitted (see Step S170 in FIG. 4).

However, since the generation of the stencil mask SM is omitted, an output result at a point of time when the processing at Step S470 is finished is different from that of the first embodiment. In a frame at Step S470, a 3D map in which the tunnel TN of the road and the underground portions UG1, UG2, and UG3 of the buildings BLD1, BLD2, and BLD3 as the underground features are drawn by overwriting is illustrated. At this point of time, the underground features such as the tunnel TN are drawn so as to penetrate the ground building BLD1 and the like previously drawn.

Subsequently, the 3D map display system 100A generates a layer on which only the ground building (ground portion of the building) is drawn by projecting separately from the drawing result at Step S470 under the same projection condition as that at Step S440 (Step S480). At this time, the 3D map display system 100A also executes depth determination of the ground buildings. Then, the 3D map display system 100A superposes this layer on the drawing result at Step S470 (Step S482). As a result, the underground feature can be displayed as if the depth determination is executed between the ground buildings BLD1, BLD2, and BLD3 and the underground feature.

If there is no underground feature (Step S450: NO), the processing in these steps is skipped.

Subsequently, the 3D map display system 100A draws the character (Step S490) and displays the result on the display apparatuses (Step S492).

According to the 3D map display processing of the fourth embodiment described above, drawing similar to that in the first embodiment can be realized even without using the stencil mask SM.

In the 3D map display processing of the fourth embodiment (see FIGS. 12 to 14), drawing of a 3D map is performed in the order of drawing of a 3D map is performed in the order of drawing of the ground surface and the ground features (Step S440)->clearing of the Z-buffer (Step S460)->drawing of the underground features (Step S470)->superposition of a layer on which only the ground building is drawn (Steps S480, 482), but the present invention is not limited to that. The drawing may be performed in the order of drawing of the ground surface and the ground features->clearing of the Z-buffer->drawing of the underground features->clearing of the Z-buffer->drawing of the ground buildings. By means of this order, too, the underground feature can be displayed as if the depth determination is executed between the ground building (ground portion of the building) and the underground feature.

G. Variation

The various processing described in the aforementioned embodiments and variations do not have to be provided altogether but a part of them may be omitted, replaced or combined with other processing.

For example, in the 3D map display system 100 of the first embodiment, the mask image generating unit 44 may be omitted. Moreover, in the 3D map display system 100A of the second embodiment, the third drawing unit 47 may be omitted.

Moreover, the 3D map display processing in the first embodiment or the second embodiment may be combined with the 3D map display processing of the third embodiment. Moreover, the 3D map display processing in the third embodiment and the 3D map display processing in the fourth embodiment may be combined with each other.

The target feature to be drawn after the Z-buffer is cleared is not necessarily limited to the underground features.

The 3D map display systems 100 and 100A of the aforementioned embodiment can be also applied to a navigation system giving route guidance by using a 3D map.

In the aforementioned embodiments, the processing executed in a software manner may be executed in a hardware manner and vice versa.

The present invention can be used for a technology for displaying a 3D map on which the ground surface and the features are represented three-dimensionally.

What is claimed is:

1. A 3D map display system for displaying a 3D map on which a ground surface and a plurality of features are represented three-dimensionally, comprising:
   a map database for storing map data representing a 3D shape of the ground surface and the features;
   a first drawing unit for drawing the ground surface and the features by executing depth determination by referring to the map database, thereby generating a first drawing result;

a second drawing unit for drawing at least one target feature, the target feature being a feature in which at least a part thereof is hidden by the ground surface or other features in the first drawing result, by overwriting the target feature on the first drawing result using the map data without executing depth determination with respect to the first drawing result, thereby generating a second drawing result; and a third drawing unit for drawing at least one specified feature among the features by superimposing the specified feature over the target feature in the second drawing result without executing depth determination with respect to the second drawing result.

2. The 3D map display system according to claim 1, wherein
the map data includes data representing an underground portion; and
the second drawing unit identifies the target feature on the basis of the data representing the underground portion and draws the target feature.

3. The 3D map display system according to claim 1, wherein
the map data stores determination information indicating whether or not each feature is the target feature; and
the second drawing unit identifies the target feature on the basis of the determination information and draws the target feature.

4. The 3D map display system according to claim 1, wherein
the map data stores a type of each feature; and
the second drawing unit identifies the target feature on the basis of the type of the feature and draws the target feature.

5. The 3D map display system according to claim 1, wherein
the second drawing unit identifies the target feature on the basis of a vertical or longitudinal positional relationship with a reference feature specified in advance as a reference for determining the target feature so as to draw the target feature.

6. The 3D map display system according to claim 1, further comprising:
a mask image generating unit for generating a mask image by projecting only a feature specified to be drawn on the front of the target feature under the same projection condition as that of the first drawing unit,
wherein the second drawing unit draws the target feature while drawing of the target feature in a portion corresponding to the mask image is prohibited.

7. The 3D map display system according to claim 1, wherein if there are more than one target features, the second drawing unit draws the target features by executing the depth determination therebetween.

8. The 3D map display system according to claim 1, wherein the specified feature is a ground feature shown on or above the ground surface.

9. The 3D map display system according to claim 1, wherein the specified feature has a corresponding feature in the second drawing result on which the target feature is overwritten.

10. A 3D map display method for displaying a 3D map on which a ground surface and features are represented three-dimensionally by a computer, the method comprising:

a first drawing process in which the computer draws the ground surface and the features by executing depth determination by referring to the map database storing map data representing 3D shapes of the ground surface and the features, thereby generating a first drawing result;

a second drawing process in which the computer draws at least one target feature, the target feature being a feature in which at least a part thereof is hidden by a ground surface or other features in the first drawing result, by overwriting the target feature on the first drawing result using the map data without executing depth determination with respect to the first drawing result, thereby generating a second drawing result; and a third drawing process in which the computer draws at least one specified feature among the features by superimposing the specified feature over the target feature in the second drawing result without executing depth determination with respect to the second drawing result.

11. The 3D map display method according to claim 10, wherein the specified feature is a ground feature shown on or above the ground surface.

12. The 3D map display system according to claim 10, wherein the specified feature has a corresponding feature in the second drawing result on which the target feature is overwritten.

13. A non-transitory computer-readable recording medium recording a computer program for displaying a 3D map on which a ground surface and a plurality of features are represented three-dimensionally, wherein the recording medium recording the computer program for having the computer realize:

a first drawing function of drawing the ground surface and the features by executing depth determination by referring to the map database storing map data representing three-dimensional shapes of the ground surface and the feature, thereby generating a first drawing result; and a second drawing function of drawing at least one target feature, the target feature being a feature in which at least a part thereof is hidden by the ground surface or other features in the first drawing result, by overwriting the target feature on the first drawing result using the map data without executing depth determination with respect to the first drawing result, thereby generating a second drawing result; and a third drawing function of drawing at least one specified feature among the features by superimposing the specified feature over the target feature in the second drawing result without executing depth determination with respect to the second drawing result, whereby the specified feature is drawn on the front of the target feature.

14. The non-transitory computer-readable recording medium according to claim 13, wherein the specified feature is a ground feature shown on or above the ground surface.

15. The non-transitory computer-readable recording medium according to claim 13, wherein the specified feature has a corresponding feature in the second drawing result on which the target feature is overwritten.

* * * * *